United States Patent [19]

Schwartz

[11] 4,208,809
[45] Jun. 24, 1980

[54] AUDIO-TIME PLOTTING EQUIPMENT AND METHOD

[75] Inventor: Robert C. Schwartz, Woodmere, N.Y.

[73] Assignee: Talijon, Inc., Woodmere, N.Y.

[21] Appl. No.: 913,510

[22] Filed: Jun. 7, 1978

[51] Int. Cl.² ............................................. G09B 29/06
[52] U.S. Cl. ........................................................... 35/1
[58] Field of Search ................. 40/438, 455, 456, 457, 40/472; 84/470 R, 484; 346/26, 19, 49; 35/8, 1

[56] References Cited

U.S. PATENT DOCUMENTS

| | | | |
|---|---|---|---|
| 557,667 | 2/1897 | Steffans | 84/470 R |
| 1,352,363 | 9/1920 | Flynn | 84/484 |
| 1,459,087 | 6/1923 | Cox | 346/49 |
| 1,775,056 | 9/1930 | Thomas | 40/472 |
| 3,743,758 | 7/1973 | Del Castillo | 84/484 |
| 3,803,971 | 4/1974 | Del Castillo | 84/484 |
| 3,886,839 | 6/1975 | Del Castillo | 84/484 |
| 3,942,404 | 3/1976 | Del Castillo | 84/484 |

Primary Examiner—William H. Grieb
Attorney, Agent, or Firm—Amster, Rothstein & Engelberg

[57] ABSTRACT

The present invention relates to a recording device to be used by choreographers as a means of forming a visual record of the precise time a cue appears on an audio track and coordinating such visually recorded cues to the audio track for use as an interface between the audio track and the microprocessor or computer devices that control the visual aspects of multi-image presentations. Additionally the present invention relates to a method of using a visual recording device as an interface. An added feature of this invention is a novel charting means that is compact in size yet stores a large quantity of information to assist the choreographer in coordinating the various events to the audio track. The charting means enables the choreographer to consider the time required between activation of the visual display equipment and the occurrence of the display to allow the equipment to cycle. The present invention is particularly adapted to interface with commercially available visual display control computers or microprocessors and includes a scaling device incorporating minimum waiting times for each particular computer or microprocessor related to various sequential commands.

10 Claims, 6 Drawing Figures

AUDIO-TIME PLOTTING EQUIPMENT AND METHOD

The present invention relates to a recording device and a novel charting means and scaling device for use in conjunction with the recording device to be used by a choreographer as an interface between the sound track or "audio base" and visual display devices, and in particular, the devices that control the visual aspects of multi-image presentations. Additionally the present invention relates to a method of using a recording device as such an interface.

Typically, audio-visual presentations involve the use of a visual presentation in the form of slides which are displayed to the audience while a sound track is playing. More sophisticated audio-visual presentations involve the change of the visual display in synchronization to the sound track. If there is a single slide projector involved, the synchronization of the slide change to the sound track is not too difficult. Typically, the proper synchronization has been accomplished by triggering the advance of the projector by placing control tones on an otherwise unrecorded track of the audio tape. When the tape is played back to a synchronizer, the control tone triggers the projector advance mechanism. Since the tones are placed on the sound tape itself, the resultant cues remain in synchronization with the audio track and the advance of the projector is synchronized.

When multiple projectors are used, the synchronization of the video presentation to the audio track becomes more complex and more critical. For example, when two projectors are used to project their image on the same screen in an alternating sequence it is generally desirable to maintain the illumination on the screen at a constant level. Thus, it is necessary to coordinate the dimming of the first projector to the lighting of the second projector and although it may be possible to simply place a control tone on a separate track, more complex commands will generally be required.

As the field of audio-visual presentations advanced further, multi-imagery was developed. Multi-image displays can typically involve the use of a matrix of individual modules. Each module is comprised of projecting means and a screen. More sophisticated systems involve a projecting means comprised of many interconnected separate projectors. The size and shape of the matrix is varied by simply adding or reducing the number of modules or units and varying their locations.

Even a simple matrix involving, for example, twelve modules, is significantly more difficult to choreograph than prior audio-visual display systems. Each of the one or more projectors in a module may be independently controlled as to advancing or reversing, fading, dissolving, slashing, alternating or simply projecting with varying lamp brightness. Additionally, it is generally necessary to fade, dissolve or cut from one projected image on the first projector to the images appearing on the other projectors in each module.

As used in this patent application, terms such as "hard cut", "dissolve", "advance", "reverse" have their normal meanings and are understood by those in this field. For example, a "cut" involves the replacement of an image projected by one projector by a second image projected by a second projector on the same screen or screen portion. Using a standard Eastman Kodak Ektagraphic Projector, a "standard" projector generally used throughout the industry, the screen goes black for approximately 0.8 seconds while the slide in the optical path is replaced in the slide tray, the slide tray rotated one notch and the next slide dropped into the optical path. The projector is constructed so that a shutter blocks the projected image so an audience viewing the change of slides would see black on the screen. If two projectors are used, it is possible to alternate projectors so that the second projector is projecting an image on the screen while the first projector is changing slides. Thus, with two projectors, one to project an image for time intervals slightly greater than 0.8 seconds while the other is changing slides and the procedure reversed, the audience will never see black.

A "hard cut" is a more instantaneous and abrupt change from the image of one projector to the image of another. A "dissolve" involves a gradual change from one projector to the other so that the first image softly becomes the second. Typical microprocessors can cause dissolves to occur over a period of time ranging anywhere from one to thirty-two seconds or longer in duration. In a dissolve, two projectors will project simultaneously; however, the intensity of the bulbs is complementary. As the first bulb becomes dimmer, the second bulb becomes brighter.

In order to control such complex operations precisely in time to the audio track, various apparatuses have been devised. For example, computers or microprocessors are now available that can be programmed to precisely cue each of twenty-four or more projectors in a multi-image audio-visual display. Such generally available microprocessors can command the projectors to perform the various functions alone or in combination, at predetermined times, to produce the required visual effects.

Although the control equipment exists to precisely command the display equipment associated with complex visual displays that perform the prearranged functions at predetermined times, it has been very difficult to correlate the audio events on the audio track requiring a change in the visual display to the programming of the microprocessor. For example, in a simple visual presentation, such as a three-projector arrangement where the projectors alternately project their images on the same screen in a predetermined sequence the second projector must be triggered at precisely the proper time to assure that the second image appears on the screen at the precise moment the shutter in the advance mechanism of the first projector causes that image to disappear while it recycles and changes to the next slide. Likewise, the third projector is triggered so that the third image appears just as the advance mechanism in the second projector causes that projector's image to be cut off. Consequently, the screen is never black and the image cuts from one projector to the next in sequence. The difficulty in such a procedure, however, is the fact that in order for a typical projector to project an image precisely in synchronization to the audio event, that projector must be triggered prior to the audio cue.

When programming the visual display associated with an audio presentation, it has been extremely difficult to consistently signal the particular projection system accurately prior to the particular sound cue. This problem is made more complex by the fact that different commands to the projector require different amounts of cycling time, and even the same commands require differing cycling time depending upon whether the projector is "waiting" or in a particular mode, since the cycling time for smooth transitions varies in both instances.

Additionally, when it is desirable to choreograph visual displays of very short duration requiring very rapid cues, such as varying a multi-image display in time to the beat of the music, it is not possible to feed the necessary commands into the microprocessor in "real time", i.e., the time it takes to actually hear the audio track. Either it is necessary to replay the same passage several times adding additional cues each time the passage is played or it is necessary to use a clock or similar timing device to note the time each cue is required. Both of these methods have several shortcomings including difficulty in coordinating the cues to each other and to a reference time, difficulty in coordinating the start of the passage to the start of the clock, the accumulation of errors in the time between successive cues and, most significantly, the inability to visually perceive the audio cues so the computer or microprocessor can be accurately programmed. For example, when short duration displays are required it is common for required minimum waiting times between subsequent commands to interfere with or otherwise influence the choreographer's selection of commands to the visual display devices. Unless there is a visual record of the audio events it may take the choreographer several tries before a satisfactory display has been choreographed.

Consequently, it is an overall object of the present invention to provide a means of visually choreographing an audio-visual presentation utilizing an apparatus and a method that presents a means of visually mapping the whole or significant portions of a sound track to provide an interface between the sound track and the input to a visual display apparatus.

It is a further object of the present invention to provide an apparatus and a method that makes it readily possible to program the microprocessor off line rather than in real time yet provides accurate synchronization of the visual cues back to the audio track.

It is a further object of the present invention to provide a means of precisely determining when a particular visual display device must be cued taking into account the cycling time required for the various operations.

It is a further object of the present invention to provide a means of visually determining precisely when a particular well-known microprocessor or computer must be programmed in order to cue a plurality of visual display devices that takes into consideration both the delays inherent in the particular display devices and the limitations of the computer.

It is a still further object of the present invention to provide apparatus that is capable of placing a signal tone on an unrecorded audio track to serve as a means of synchronizing the choreographer to the audio track.

It is a still further object of the present invention to provide a visual presentation of the amount of time to each particular cue in a manner that can be related back to a given reference point or can be calculated from cue to cue to minimize an error in calculating the respective cue times and avoiding any accumulation of error.

A still further object of the present invention is to provide a compact, readily removable record of cues.

A still further object of the present invention is to provide an apparatus that is compact, durable and economical to manufacture that is also, in spite of its small size, capable of mapping a significant amount of audio track on a single chart.

A still further object of the present invention is to provide a method of using a visual recording device as an interface between the audio track and the microprocessor or computer devices used to control a multi-image visual presentation, editing of film (especially animated film), video taping, dance choreography and lighting choreography (such as theatre lights).

In accordance with one embodiment of the present invention, there is provided an apparatus for visually representing events as a function of time on a chart to enable a choreographer, charged with coordinating the visual portion of an audio-visual display to the audio sound track in a manner that allows him to indicate the points of significance to the sound track at the instant they actually occur, to translate such information to meaningful commands to a microprocessor or computer "off line" or in "leisure time" rather than in the abbreviated space of time between actual events. The visual choreographer apparatus made in accordance with an embodiment of the present invention is a compact piece of equipment comprising a housing including a panel having a viewing area. A pair of rollers is rotatably mounted in the frame in spaced parallel relation to each other and drive means are associated with at least one of these rollers. The housing includes drive means control circuitry which allows the drive means to operate in the forward and reverse direction in the manual mode and in the forward direction in an automatic mode. A charting means or chart is receivable about the rollers and rotates in a continuous loop with a portion of the chart visible through the viewing area throughout the rotation of the chart. The chart includes a first group of relatively parallel lines substantially parallel to an axis of one of the rollers, and a second group of relatively parallel lines substantially perpendicular to the first group.

The panel of the housing has a referencing line which is substantially parallel to the first group of parallel lines and is adjacent to the viewing area on the panel. The circuitry of the visual choreographer includes electronic means for generating a signal pulse of a predetermined frequency and delivering the pulse to an input-/output jack. Additionally, the visual choreographer includes electronic means for receiving a signal pulse. In the automatic mode, the visual choreographer will become activated responsive to the receipt of a signal pulse of a predetermined frequency at an input/output jack.

The present invention also provides a method of programming a visual display control computer to choreograph at least one visual display device to an audio track using a time charting device similar to the visual choreographer disclosed herein, comprising the steps of advancing the charting means or chart at a constant speed, starting an audio track and marking the starting time of the audio track on the advancing chart. Then, the choreographer marks the occurrence time of each successive audio event (e.g., musical beat or start of a new passage) requiring a corresponding visual activity (e.g., change of projected image) on the advancing chart. At the end of the audio track, the chart is stopped and the choreographer selects the desired visual activity for each audio event. The precise amount of delay or equipment cycling time from initiation to occurrence for each selected visual activity must be determined. Then the choreographer measures backwards on the chart to determine the precise initiation time for each activity and marks the chart at the precise initiation time. Next, the time intervals between initiation times can be measured and recorded. The recorded time intervals and particular commands required to program the visual display control computer to choreograph selected visual activities at the desired time intervals are then fed into the computer.

The visual display control computer can also be programmed by using the time charting device which has a signal pulse generating capability and is also activatable responsive to the receipt of a signal pulse of a predetermined frequency. The steps of such method of programming are as follows: First, the charting means or chart is set at a starting point, and the starting point is marked on the chart with a marking pen by the choreographer. Next, the audio tape is played on a multi-channel tape recorder/player with the output jack of the time charting device attached to the input of the tape recorder/player. When the audio track reaches the start of the portion that is to be choreographed, whether it is the beginning of the piece or the beginning of a particular phrase or theme in the work, the choreographer uses the pulse-generating capability of the time charting device to place a signal pulse on an otherwise unused channel of the audio track. If the time charting device was caused to start by the placing of the signal pulse, then both the audio track and the charting means are rewound to the start portion. Next, the audio track is replayed with the output of the tape recorder attached to the input of the pulse receiver circuitry of the device and the signal pulse on the otherwise unused channel of the audio tape causes the charting means to activate and advance. The choreographer then marks the occurrence time of each successive audio event requiring the corresponding visual activity on the advancing chart itself and repeats the procedure generally set forth above as often as required. By the use of the same signal pulse the time charting device and the audio track remain in proper synchronization.

The present invention also relates to a charting means or chart for use in conjunction with the visual choreographer device comprising a substantially rectangular sheet of paper including a leading edge, a trailing edge, a top side edge and a bottom side edge. A series of advancing holes are located along at least one side edge of the sheet. The chart contains a first group of equally-spaced, parallel line segments substantially parallel to the leading edge of the sheet. It also contains a second group of equally-spaced, relatively parallel line segments extending from, and sloping downwardly from, the leading edge to the trailing edge of the sheet. Each line segment in the second group of line segments has a negative slope substantially equal to the space between adjacent spaced line segments in the second group of line segments divided by the entire length of each line segment in this second group. Thus, when the leading and the trailing edges of the sheet are joined to form a continuous loop, the second group of line segments forms a continuous, substantially helical line extending generally downwardly from the top side edge to the bottom side edge.

The present invention also includes a scaling device correlated to the performance characteristics of a particular visual display computer. This scale also contains markings that vary depending upon the number of visual display devices actually being utilized at any given time. The scale is used in conjunction with the charting means which has already had the occurrence points for various events placed thereon. The scale is comprised of a transparent, elongated body portion containing various indicia. A first set of indicia contains a scale in a particular scale factor to correlate time as a function of distance on the chart. The scale also contains a second scaling means containing markings in the same scale factor to correspond to the minimum time required between a particular cue and a subsequent cue for a specified number of display devices. Other embodiments of the scale contain additional scaling means with markings corresponding to a different, specified numbers of display devices. Additionally, other different scales are utilized in conjunction with the chart on the visual choreographer to correlate the chart to the performance of other visual display computers or microprocessors.

The above description as well as further objects, features and advantages of the present invention will be more fully understood by reference to the following detailed description of a presently preferred, but nonetheless illustrative, visual choreographer apparatus in accordance with the present invention which is utilized to practice the method of the present invention, when taken in conjunction with the accompanying drawings, wherein.

Figure 1:
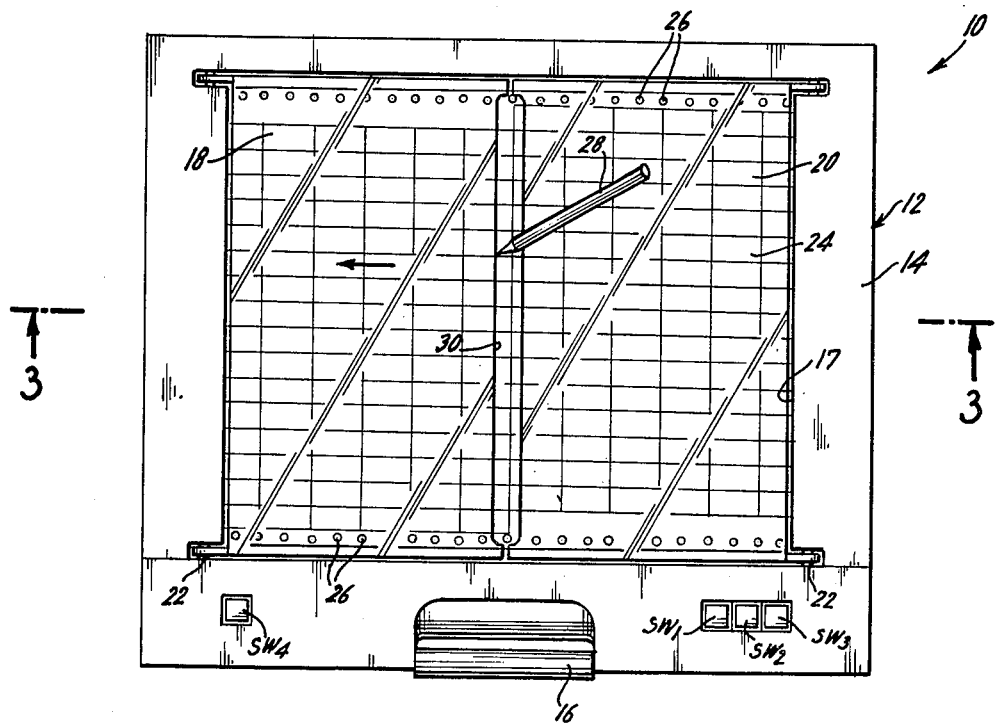
FIG. 1 is a top plan view of the visual choreographer apparatus.
Figure 3:
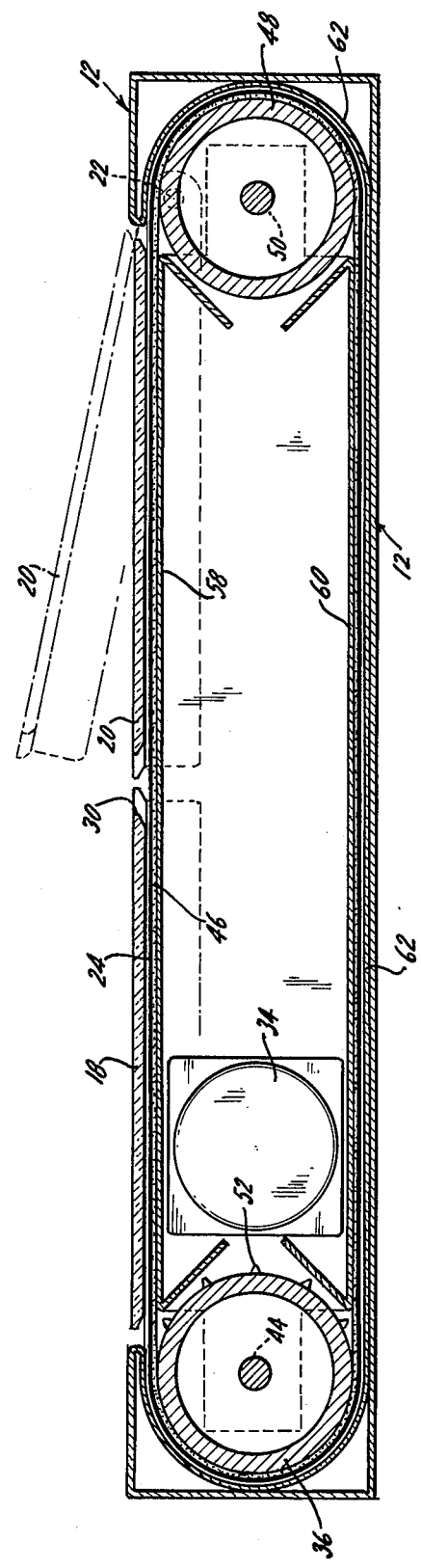
FIG. 3 is a side sectional view taken along lines 3—3 in FIG. 1.

Referring specifically to the drawings, there is shown in FIG. 1 a visual choreographer generally designated by the reference numeral 10. Visual choreographer 10 is housed in a substantially rectangular housing 12 approximately 12 inches deep by 15 inches wide and 2 inches high. The top surface 14 of housing 12 contains an integral handle 16 and several push button controls, SW1, SW2, SW3 and SW4. The major portion of top surface 14 is comprised of a substantially rectangular cut-out viewing portion 17 covered by doors 18, 20 of transparent material. As best shown in FIG. 3, each of doors 18, 20 opens upwardly about pivots 22, 22.

Left and right doors 18, 20 are opened to permit access to chart or charting means 24. Chart 24 contains a plurality of advancing holes 26 spaced approximately one-half inch apart along the top and bottom edges of said chart 24.

In operation, left and right doors 18, 20 are placed in the closed position and a marking pen, pencil or similar marking means 28 is placed along referencing line 30 on left door 18. During operation, chart 24 moves forward in the direction shown by the arrow in FIG. 1.

Figure 2:
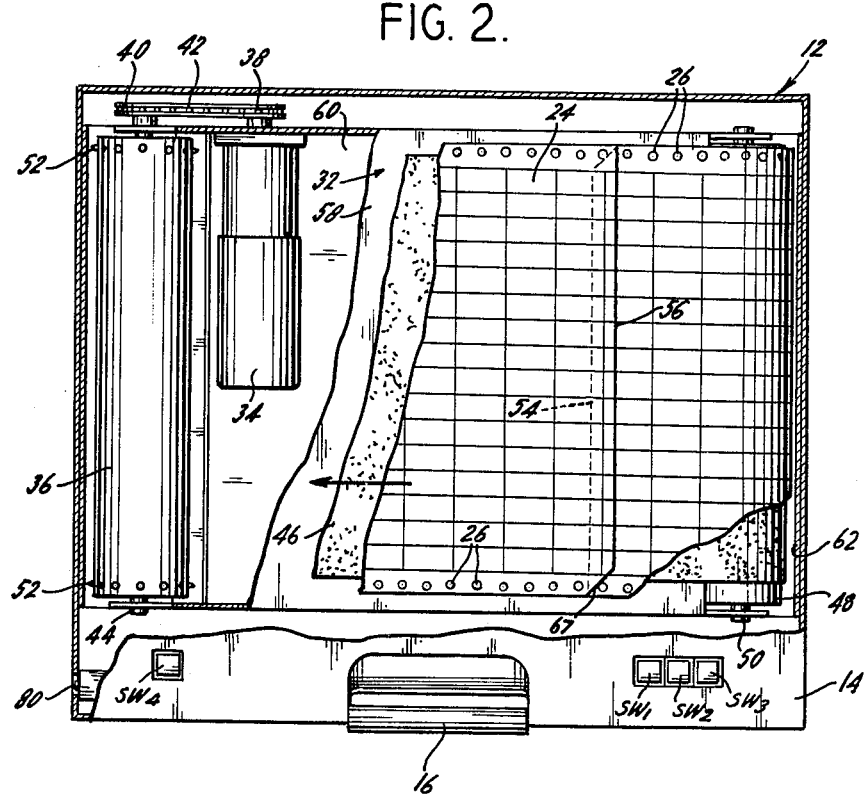
FIG. 2 is a partially sectioned, top view showing details of the inner construction of the apparatus.

FIG. 2 shows the visual choreographer of the present invention in partial section. As shown therein, an inner frame 32 supports a synchronous motor 34 which is connected to driving roller 36 by sprockets 38, 40 and drive chain 42. Driving roller 36 is rotatable within bearings 44 mounted in inner frame 32. Rubber belt 46 transmits the rotation of driving roller 36 to idler roller 48, also rotatably mounted to inner frame 32 on bearings 50. Although rubber belt 46 connecting driving roller 36 to idler roller 48 is shown in this embodiment, such belt is optional. Driving roller 36 is provided with a plurality of spaced driving pins 52 cooperating with advancing holes 26 in chart 24.

To engage chart 24 in the visual choreographer 10, the leading edge 54 of charting means 24 is directed over driving roller 36 until driving pins 52 engage at least one advancing hole on the top and bottom edges of the chart 24. Chart 24 is then caused to travel around driving roller 36 and follow a lower path through the housing defined by the bottom surface of housing 12 and the bottom plane 60 of inner housing 32. Next charting means is caused to move around idler roller 48 until leading edge 54 of chart 24 reappears on the top surface of visual choreographer 10. The trailing edge 56 of chart 24 overlaps leading edge 54 forming, in effect, a continuous loop.

Referring to FIG. 3, inner frame 32 also provides upper plane 58 which cooperates with doors 18, 20 to define the upper path of charting means 24 (shown as a black line). Upper plane 58 also provides a hard surface against which the choreographer can bear marking pen 28 when placing marks on chart 24.

To assure that chart 24 follows the proper path subframe 62 is constructed and arranged to substantially conform to the outer contours of driving roller 36 and idler roller 48 at the left and right end of housing 12, respectively, and also contains a smooth, straight portion inside the bottom of housing 12.

By defining the passage for the charting means between inner housing 62 and the bottom of housing 12, it is possible to reverse the direction of rotation of chart 24 without the chart becoming unraveled, even though leading edge 54 and trailing edge 56 of chart 24 are not affixed to each other. Other embodiments of chart 24 may include a means of fastening the leading edge 54 to the trailing edge 56, such as double sided tape or contact cement.

In order to remove chart 24 from the visual choreographer 10, trailing end 56 of chart 24 is caused to advance past referencing line 30. Left door 18 is then rotated open and the chart 24 caused to rotate in the reverse direction. Chart 24 will disengage from the visual choreographer when an obstruction such as a finger is placed in the area of referencing line 30 causing trailing end 56 of chart 24 to be driven out of the choreographer.

Another embodiment of the visual choreographer includes a guide (not shown) moveable along referencing line 30 for receiving marking pen 28. The guide is connected to motor 34 through a mechanism such as a lead screw which translates the rotation motion of motor 34 to linear motion of the guide along referencing line 30 in synchronization to chart 24. This arrangement provides a means whereby the guide will always indicate the precise horizontal and vertical location on chart 24 corresponding to every given instant of time.

Figure 4:
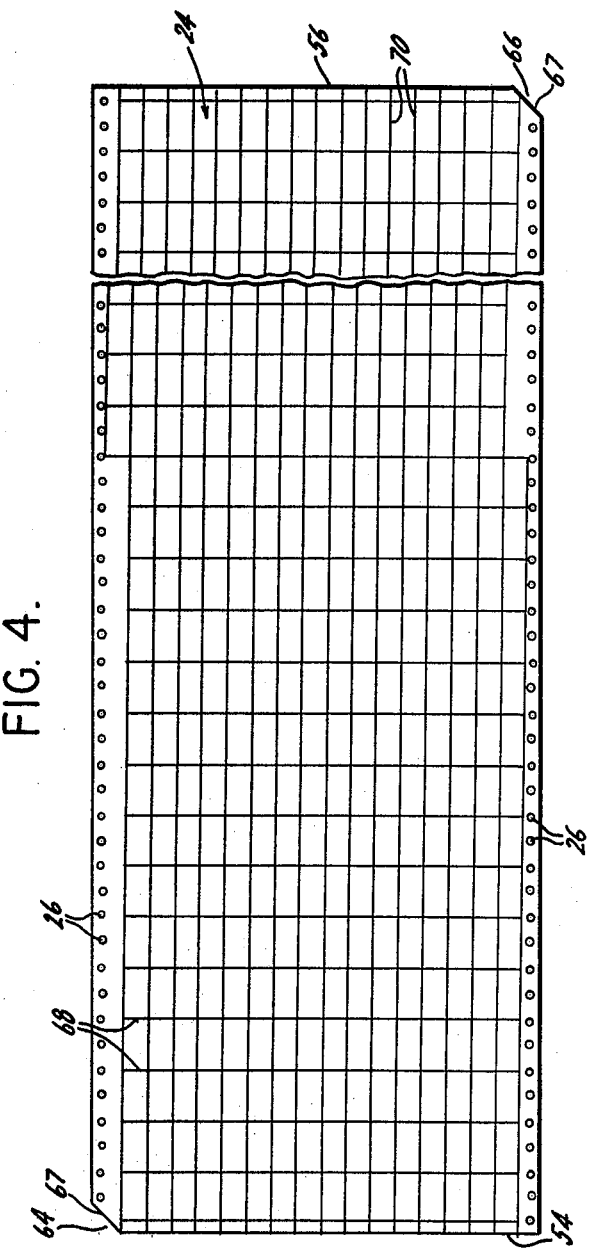
FIG. 4 is a view showing, in fragmented manner, the novel charting means of the present invention including the primary indicia thereon.

FIG. 4 shows, in a partially fragmented view, the novel construction of chart 24. The actual size of chart 24 in the preferred embodiment is $8\frac{1}{2}$ inches high by $30\frac{1}{2}$ inches wide. Specifically, the top and bottom edges contain a plurality of advancing holes 26 spaced approximately one-half inch apart in corresponding relation to the driving pins 52 on driving roller 36. As shown in FIG. 4, the opposite corners 64, 66 of chart 24 contain triangular cut-outs 67, 67. At least one advancing hole 26 from the top series of holes and a diagonally opposite advancing hole 26 in the bottom series of advancing holes are removed by the cut-outs 67, 67 to assure that when chart 24 is engaged around driving and idler rollers 36, 48, respectively, each driving pin 52 on a roller will engage only a single thickness of charting means having advancing holes. Consequently, it is not necessary to glue, or otherwise fasten, the leading and trailing edges 54, 56 of chart 24 to obtain trouble-free performance in both the forward and reverse directions.

Chart 24 contains primary indicia including a plurality of equally spaced, parallel line segments 68 shown vertically in FIG. 4. Each line segment 68 is spaced from the next adjacent line segment 68 precisely one inch in the preferred embodiment. A secondary series of indicia (not shown) divide the one inch space between adjacent segments 68 into subsections one-tenth of an inch wide. Chart 24 also contains a second set of parallel, equally spaced line segments 70 shown substantially horizontally in FIG. 4. Each line segment 70 is spaced from the next adjacent line segment 70 approximately one-half inch apart in the preferred embodiment. Specifically, each line segment 70 has a downward slope equivalent to one-half inch over the approximately thirty-inch width of chart 24 whereby when chart 24 is wound into a continuous loop around driving and idler rollers 36, 48 so that trailing edge 56 overlaps leading edge 54, line segments 70 cooperate to form a substantially continuous helical line.

Since chart 24 is approximately thirty and one-half inches wide in the preferred embodiment, when chart 24 is mounted within visual choreographer 10 to form a loop and an overlap of approximately half an inch is allowed, a recording length of thirty inches for each revolution is created. Motor 34 causes driving roller 36 to rotate at the precise speed required to drive chart 24 past referencing lines 30 at the precise, synchronous speed of one inch per second whereby each revolution of chart 24 will require thirty seconds.

The height of chart 24 is approximately eight and one-half inches with eight inches being available for recording purposes. The substantially horizontal lines one-half inch apart cooperate to form a helical line which is seventeen revolutions long (with 30 inches or 30 seconds per revolution) and, consequently, is eight hundred and ten inches (or seconds) in overall length. Thus, a single chart 24 can be used to record choreographic information for a continuous piece of audio track eight and one-half minutes long or for approximately eight and one-half minutes of cueing throughout a much longer audio track.

Figure 5:
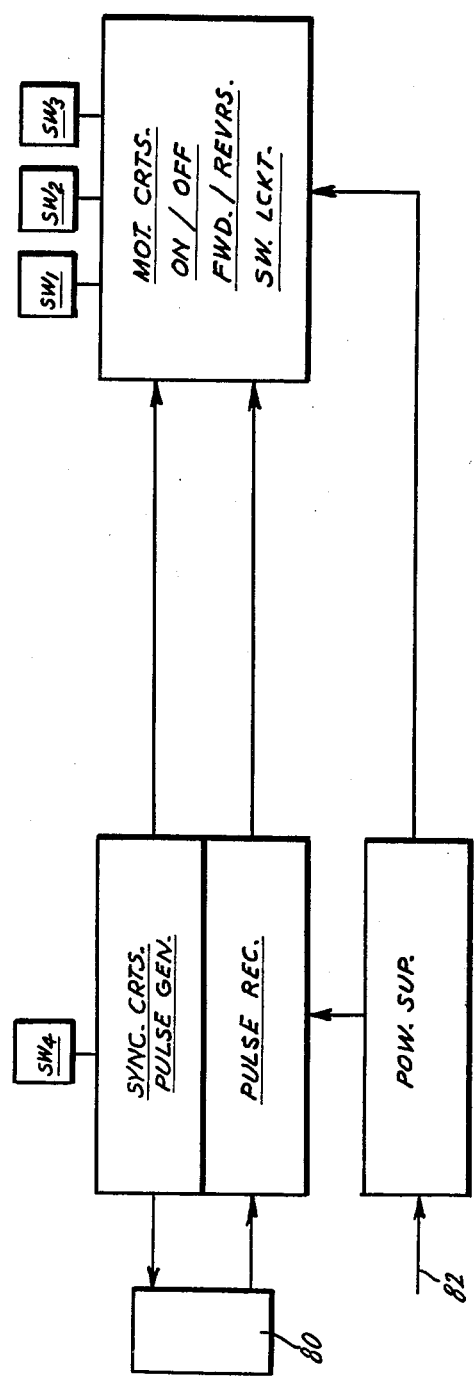
FIG. 5 is a block diagram showing the interrelationship of the electric circuitry of the present invention; and, FIG. 6 is a top plan view of the scale utilized in conjunction with the apparatus of the present invention.

Referring to FIGS. 1 and 5, the front right corner of top surface 14 contains three push button controls. The first push button SW1 is a momentary switch that activates a relay in the motor control circuitry which latches in the "on" condition to cause the motor 34 to operate in the forward direction. Switch SW2 is a momentary push button switch that interrupts the flow of current to the relay and causes the motor control circuitry to allow motor 34 to instantaneously stop. Switch SW3 is also a push button, momentary contact switch. This switch causes a second relay in the motor control circuitry to activate the motor 34 in the reverse direction.

The front, leftmost corner of the top surface 14 of the visual choreographer 10 contains push button switch SW4 which serves several functions. First, activation of SW4 causes the synchronization circuitry to shift to the pulse or signal generation mode. Simultaneously, SW4 causes the motor control circuitry to operate in the forward direction. Release of SW4 allows the synchronization circuitry to return to the pulse or signal received mode.

FIG. 5 shows, in diagrammatic form, the interaction of the various circuitry in the visual choreographer 10. As discussed above switches SW1, SW2 and SW3 activate or deactivate the motor control circuits (mot. crts.) in the forward or reverse directions. To protect the motor 34 there is a switch lockout circuit (sw. lckt.) that prevents activation of the reverse relay if the forward relay is activated. In the forward direction, switch lockout circuitry requires that the forward relay be deactivated by the operation of SW2 prior to attempting to reverse motor 34.

A power supply (pow.sup.) is used to supply electrical power to the motor control circuitry and the synchronization circuits (sync. crts.). The electrical power to the power supply is provided by a line cord 82.

The synchronizing circuitry is used to generate a 1,000 hz. tone. When a pulse is received, the pulse-receiving synchronization circuitry causes the motor control circuitry to become activated in the forward direction, thereby instantaneously starting the operation of the visual choreographer 10. In the preferred embodiment phonojack 80 provides both the input and the output for both the pulse generating and the pulse receiving synchronization circuits.

The specific details of the internal circuitry of the visual choreographer 10 are conventional.

The operation of the visual choreographer 10 in the manual mode is as follows. Typically, the visual choreographer 10 is used in conjunction with a multi-track tape recorder/player. The visual choreographer 10 is set so a vertical line 68 on chart 24 appears directly below the referencing line 30. This starting point is marked by the choreographer placing a short vertical line across the highest available substantially horizontal line 70. The left door 18 can then be opened and necessary information identifying the particular phrase, theme or passage is added to the chart 24 by the choreographer using marking pen 28. The tape recorder is then placed in the playback mode and the audio track started. As soon as the particular passage that is to be choreographed is heard (or when the audio track starts), the choreographer presses the push button switch SW1 thereby instantaneously starting the rotation of chart 24. The choreographer then uses marking pen 28 (which is held against referencing line 30 as a guide) to indicate the beats or major themes that will be synchronized to a change in the visual display. As soon as the end of the theme or passage is reached, the choreographer presses stop switch SW2. Because of the novel construction of the indicia on chart 24 it is possible to choreograph up to eight and one-half minutes of audio track on chart 24 at one time.

A significant feature of the present invention is the ability to operate in an automatic mode. Operation in the automatic mode is as follows:

Again, a multi-channel tape recorder/player is utilized. However, in this instance the visual choreographer 10 is used to generate a 1,000 hz. tone which is placed on an otherwise unused channel of the audio tape. Specifically, the visual choreographer 10 is provided with an RCA-type phonojack 80, shown in FIG. 2. In order to use the visual choreographer 10 in the automatic mode the phonojack 80 is connected to the input of the tape recorder and the start time is marked on charting means 24 by the choreographer. Next, the audio track is played on the tape recorder and prior to the precise moment the phrase or passage to be choreographed starts, the pulse pushbutton switch SW4 is depressed for a period of approximately half a second. The depression of this pushbutton generates the 1,000 hz. tone onto the otherwise unused channel of the tape which simultaneously activates motor 34 in the forward direction. The choreographer can then mark the beats on chart 24 as described above for the manual mode.

Alternatively, to take full advantage of the capabilities of the visual choreographer 10, stop switch SW2 is pressed and phonojack 80 is switched from the input of the tape recorder to the output of the tape recorder track upon which the 1,000 hz. tone was placed. The tape recorder is rewound and the visual choreographer 10 also rewound so the starting point marked on chart 24 is directly beneath the referencing line 30.

The tape recorder is started and the passage played from a point prior to the point where the 1,000 hz. tone was placed. When the audio track reaches the point on the tape where the 1,000 hz. tone occurs, the pulse-receiving circuitry in the visual choreographer 10 causes the motor circuitry to become activated and the visual choreographer is instantaneously started. In this manner, the visual choreographer 10 can be precisely synchronized to the start of the passage being choreographed in a readily repeatable manner.

The choreographer plots the particular beats or other events that have significance for the visual display on the charting means 24 itself in the same manner as when the visual choreographer 10 is used in the manual mode. If it is necessary to replot the particular phrase or portion of the audio track, it is merely necessary to rewind both the visual choreographer (resetting it precisely at the same start point) and the tape recorder (past the point containing the 1,000 hz. signal). When the audio tape is replayed and the signal again occurs, the visual choreographer 10 will restart in precise synchronization to the audio track.

Whether the visual choreographer is used in the manual or the automatic mode, in order to use chart 24 to choreograph the audio track, the choreographer removes chart 24 containing the marks corresponding to the cue points from visual choreographer 10.

After plotting the beats on the chart 24 the choreographer can simply count the amount of space between the marks on the chart to determine visually the precise amount of time between beats. By referring to the waiting times set forth in the operator's manual relating to a particular microprocessor or computer, the choreographer can decide which cues must be given to a projector to result in a visual display synchronized to the audio track.

For example, according to the operator's manual for the AVL Show-Pro V Version B Multi-Image AV Computer which is typical of computers used in this industry, when more than one projector is used and all projectors are ready, subsequent cues may be made one-tenth of a second apart. However, in order to have smooth visual-to-visual transitions, the choreographer must wait the minimum prescribed times for repetitive commands. That is, when two projectors are being used with this type of computer, the proper waiting time to be added to the one-tenth of a second between cues on a screen is seven-tenths of a second for a hard cut, 1.6 seconds for a cut, 2 seconds for a one-second dissolve, three seconds for a two-second dissolve, and so forth.

If three projectors are used, the waiting time to be added to the one-tenth of a second between cues for a hard cut is one-half second, for a cut is seven-tenths of a second, for a one-second dissolve is one second, for a two-second dissolve is one-and-a-half seconds, for a four-second dissolve is three-and-a-half seconds, and so forth.

When three projectors are used, the cues can be made faster since during all sequencing the third projector has had the opportunity to advance and wait for the next cue.

Figure 6:
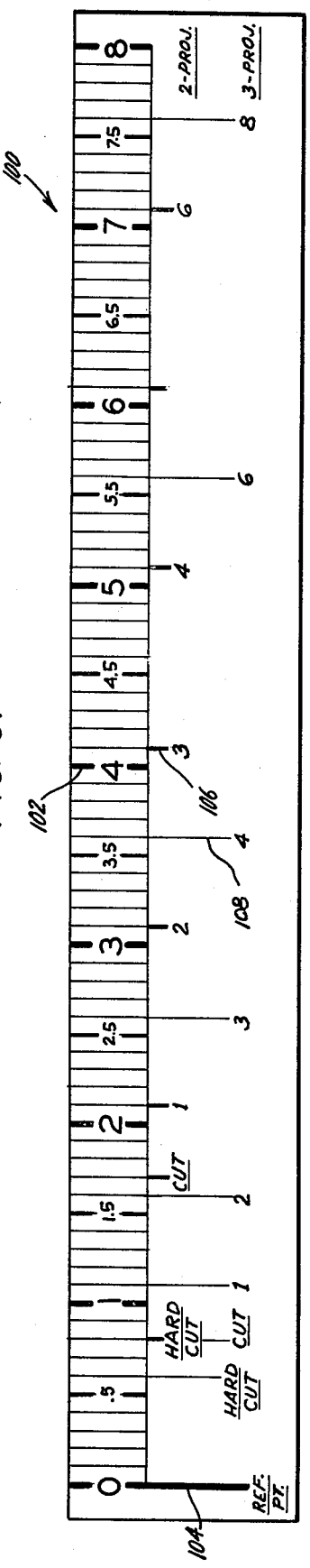

Using the waiting time figures set forth in the operator's manual and the chart 24 from the visual choreographer 10, the computer can be readily programmed. For example, if the chart 24 indicates that certain musical beats occurred 0.85 seconds apart, the choreographer would readily determine that to cause visual-to-visual transitions using three projectors in sequence, he can "cut" from picture to picture which requires a minimum of 0.8 seconds total. However, he would have to use "hard cut" (also requiring 0.8 seconds) if only two projectors were used in the sequence. Alternatively, he could choreograph to every second beat and then "cut" between two projectors. Instead of referring back to the operator's manual, the choreographer can utilize the novel charting scale of the present invention, shown in FIG. 6 and generally designated by reference numeral 100, in order to more readily correlate the cue points back to the point in time at which a particular command must be given to the computer.

Specifically, charting scale 100 is a loose ruler-like device that allows the choreographer to accurately measure the time intervals between cues and to determine directly from the indicia contained on the charting scale precisely when particular commands must be given to a visual display device. The topmost scale 102 is calibrated in tenths of an inch and thus provides a convenient distance and time measurement.

The charting scale 100 is used by placing the scale on chart 24 with the reference point 102 aligned with the previous cue. The indicia on a particular charting scale 100 is coordinated to a particular model microprocessor. The charting scale 100 shown in FIG. 6 contains markings for an AVL Show-Pro V Version B Multi-Image AV Computer, which is a device commonly used in the industry. By placing the reference point on the chart 24 at the time of the last cue, the scale on the charting scale 100 directly reads out the minimum amount of time required before the projectors can be given another cue. The minimum time or distance depends upon the nature of the preceding cue. For example, if the preceding cue was for a two-second dissolve and two projectors were being used simultaneously, the center scale 106 (corresponding to two projectors) indicates that the projectors could not be re-cued for 3.1 seconds. Thus, if the choreographer wanted to "latch on" to a musical beat occurring 2.5 seconds after the reference point, it could not be done with two projectors. It would be possible, however, to latch on to that musical beat if the initial cue had been instead a one-second dissolve. In such case, the two projectors could have been re-cued in 2.1 seconds according to the charting scale.

Alternatively, the bottom scale 108 on the charting scale 100 indicates that if three projectors were used in a sequence, it would be possible to re-cue the projectors every 1.6 seconds after a two-second dissolve. Thus, there would be enough time to latch onto a musical beat occurring 2.5 seconds after the reference point. In such case it would not be necessary to change the initial cue to a one-second dissolve.

A latitude of modification, change and substitution is intended in the foregoing disclosure. Accordingly, it is appropriate that the appended claims be construed broadly and in a manner consistent with the spirit and scope of these inventions.

What is claimed is:

1. A visual choreographer for use in visually representing events as a function of time comprising a housing including a panel having a viewing area; a pair of parallel rollers rotatably mounted in said frame in spaced relation to each other; drive means associated with at least one of said rollers; drive means control circuitry in said housing; charting means receivable about said rollers and rotating therewith in a continuous loop having a portion of said charting means visible through said viewing area throughout the rotation of said charting means, a referencing line on said panel adjacent said viewing area parallel to an axis of one of said rollers: means for selectively generating a signal pulse; means for receiving a signal pulse; an output and input means on said housing operatively connected to said signal generating and said signal-receiving means.

2. A visual choreographer as recited in claim 1 wherein said roller drive means is comprised of an electric motor.

3. A visual choreographer as recited in claim 2 wherein said pulse-receiving means is comprised of electronic circuitry responsive to a predetermined frequency audio tone including a motor-actuating relay whereby input of an audio tone of predetermined frequency to said visual choreographer at the input means of said visual choreographer will cause said motor to rotate said charting means.

4. A visual choreographer as recited in claim 2 further comprising a switch on said panel and a motor-actuating relay in said housing responsive to said switch means.

5. A visual choreographer as recited in claim 1 further comprising a switch means operatively connected to said signal pulse generating means whereby actuation of said switch generates a pulse at said output means.

6. A visual choreographer as recited in claim 1 wherein said charting means includes a first plurality of relatively parallel lines substantially parallel to an axis of one of said rollers and a second plurality of relatively parallel lines substantially perpendicular to said first plurality of parallel lines.

7. A visual choreographer as recited in claim 6 wherein said charting means is a rectangular sheet further comprising a leading edge substantially parallel to said first plurality of relatively parallel lines, a trailing edge, a top side edge, a bottom side edge and a plurality of equally-spaced advancing holes located along a side edge of said sheet.

8. A visual choreographer as recited in claim 7 wherein said at least one roller driven by said drive means further comprises a plurality of radially extending chart-advancing pins spaced from each other a distance corresponding to said equally-spaced advancing holes in said rectangular sheet in engaging relationship to said rectangular sheet.

9. An apparatus for use in visually representing events as a function of time to correlate events on an audio track with commands to a visual display computer comprising, a substantially rectangular housing including a top panel having a viewing area; a pair of parallel rollers rotatably mounted in said frame in spaced relation to each other; an electric motor operatively connected to at least one of said rollers; motor control circuitry in said housing; charting means receivable about said rollers and rotating therewith in a continuous loop having a portion of said charting means visible through said top viewing area throughout the rotation of said charting means, said charting means including a first plurality of relatively parallel lines substantially parallel to an axis of one of said rollers and a second plurality of relatively parallel lines substantially perpendicular to said first plurality of parallel lines, a referencing line on said panel adjacent said viewing area parallel to said first plurality of lines; means for selectively generating a signal pulse; means for receiving a signal pulse and actuating said motor control response to said signal pulse; and a scaling means comprising a transparent elongated body portion and indicia on said body portion, said indicia including a first scaling means containing markings in a scale factor corresponding to time as a function of distance in a preselected relationship and a second scaling means containing markings in said scale factor used in said first scaling means corresponding to minimum time between a particular event and a subsequent event on said chart whereby said scale provides a direct indication of available commands that can be given to said visual display computer.

10. The apparatus recited in claims 2 or 9 further including a guide moveably mounted along said referencing line and means operatively connected to said motor for moving said guide in a synchronized relationship to said charting means.

* * * * *